United States Patent
Chaware et al.

(10) Patent No.: US 11,140,032 B2
(45) Date of Patent: Oct. 5, 2021

(54) SYSTEM AND METHOD FOR BUILDING IDEMPOTENT CONFIGURATION MANAGEMENT MODULES FOR A CLOUD INFRASTRUCTURE SERVICE

(71) Applicant: ORACLE INTERNATIONAL CORPORATION, Redwood Shores, CA (US)

(72) Inventors: Rohit Ravindra Chaware, Bangalore (IN); Sivakumar Melapannai Thyagarajan, Bangalore (IN); Debayan Gupta, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/370,301

(22) Filed: Mar. 29, 2019

(65) Prior Publication Data
US 2019/0342166 A1  Nov. 7, 2019

Related U.S. Application Data

(60) Provisional application No. 62/666,839, filed on May 4, 2018.

(51) Int. Cl.
*G06F 15/177* (2006.01)
*H04L 12/24* (2006.01)
*G06F 9/50* (2006.01)

(52) U.S. Cl.
CPC ........ *H04L 41/0823* (2013.01); *G06F 9/5005* (2013.01); *H04L 41/0806* (2013.01); *H04L 41/0813* (2013.01)

(58) Field of Classification Search
CPC ..... H04L 67/10; H04L 47/70; H04L 41/5054; G06F 9/4558; G06F 9/5072
See application file for complete search history.

(56) References Cited

U.S. PATENT DOCUMENTS

| | | | |
|---|---|---|---|
| 7,426,523 B2 * | 9/2008 | Schroeder | G06F 9/465 |
| 2005/0050175 A1 * | 3/2005 | Fong | G06F 9/44505 |
| | | | 709/220 |
| 2011/0231525 A1 | 9/2011 | Balani et al. | |
| 2012/0102494 A1 | 4/2012 | Cahill et al. | |

(Continued)

FOREIGN PATENT DOCUMENTS

EP  2405386  1/2012

OTHER PUBLICATIONS

International Search Report and the Written Opinion of the International Searching Authority dated Jun. 24, 2019 for PCT Application No. PCT/US2019/027953, 12 pages.

*Primary Examiner* — Brian Whipple
*Assistant Examiner* — Gregory P Tolchinsky
(74) *Attorney, Agent, or Firm* — Tucker Ellis LLP

(57) ABSTRACT

Embodiments provide a system and method for building idempotent configuration management modules for cloud infrastructure services. Idempotency of a configuration management (CM) task in a CM plan is one of the mechanisms used to achieve repeatable and reliable automations of configuration management tasks. This helps DevOps and operations personnel reliably apply and maintain configuration of their systems.

20 Claims, 6 Drawing Sheets

(56) References Cited

U.S. PATENT DOCUMENTS

| | | | |
|---|---|---|---|
| 2014/0280961 A1* | 9/2014 | Martinez | H04L 41/5054 |
| | | | 709/226 |
| 2014/0344810 A1* | 11/2014 | Wang | G06F 9/455 |
| | | | 718/1 |
| 2015/0067171 A1 | 3/2015 | Yum et al. | |
| 2018/0239642 A1* | 8/2018 | Yamato | G06F 9/46 |
| 2019/0018471 A1* | 1/2019 | Chen | G06F 9/5094 |
| 2019/0213044 A1* | 7/2019 | Cui | G06F 9/5061 |
| 2019/0332798 A1* | 10/2019 | Frost | H04L 9/30 |

\* cited by examiner

SYSTEM AND METHOD FOR BUILDING IDEMPOTENT CONFIGURATION MANAGEMENT MODULES FOR A CLOUD INFRASTRUCTURE SERVICE

CLAIM OF PRIORITY

This application claims the benefit of priority to U.S. Provisional Patent Application entitled "SYSTEM AND METHOD FOR BUILDING IDEMPOTENT CONFIGURATION MANAGEMENT MODULES FOR CLOUD INFRASTRUCTURE SERVICE", Application No. 62/666,839, filed on May 4, 2018, which application is herein incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to infrastructure provisioning and configuration management.

BACKGROUND

Modern cloud-native applications and traditional enterprise applications deployed to the cloud require a large number of virtualized cloud infrastructure elements/services and software components for their operation.

One of the major benefits that cloud infrastructure providers offer their customers is the flexibility. This flexibility can include adding and removing Infrastructure Service components to allow customers adjust rapidly to application load, optimally manage costs, and improve their service reliability. However this flexibility brings with it challenges of operational stability and reliability, due to a resultant "configuration drift" of the actual infrastructure from the desired infrastructure.

DevOps (development and operations) teams have therefore moved to widely adopting "Infrastructure as Code" (IaC) practices to handle this challenging task of provisioning and maintaining such large, dynamic, complex cloud infrastructure. IaC is the use of automation and standard software development practices to declare and manage the provisioning of infrastructure, deploy applications and configure systems. Such IaC practices help DevOps and operations teams balance the "tension" between software reliability and the need to constantly evolve the software to meet new or changing customer needs.

Idempotency of an individual configuration management (CM) task in a CM plan is one of the key mechanisms to achieve repeatable and reliable automations of infrastructure provisioning and configuration management tasks. This helps DevOps and operations personnel reliably apply and maintain configuration of their systems.

However developing a configuration management module for a Cloud Infrastructure Resource so that it ensures idempotency for all actions against that Resource, without requiring the user to follow a restricted set of rules is difficult.

SUMMARY

Systems and methods for building idempotent configuration management modules in a cloud infrastructure service. The method can be employed to guarantee idempotency for configuration management modules of cloud provider resources. This method ensures that all use-case scenarios with respect to idempotency are correctly handled. By ensuring idempotency, the user can be assured that the "desired state" of their topology is reached correctly. The solution also makes it easier for the user, to express the desired state of the Resource in a succinct and friendlier (as the user doesn't need to include anything special in their inputs to get idempotency) manner.

DETAILED DESCRIPTION

Figure 1:
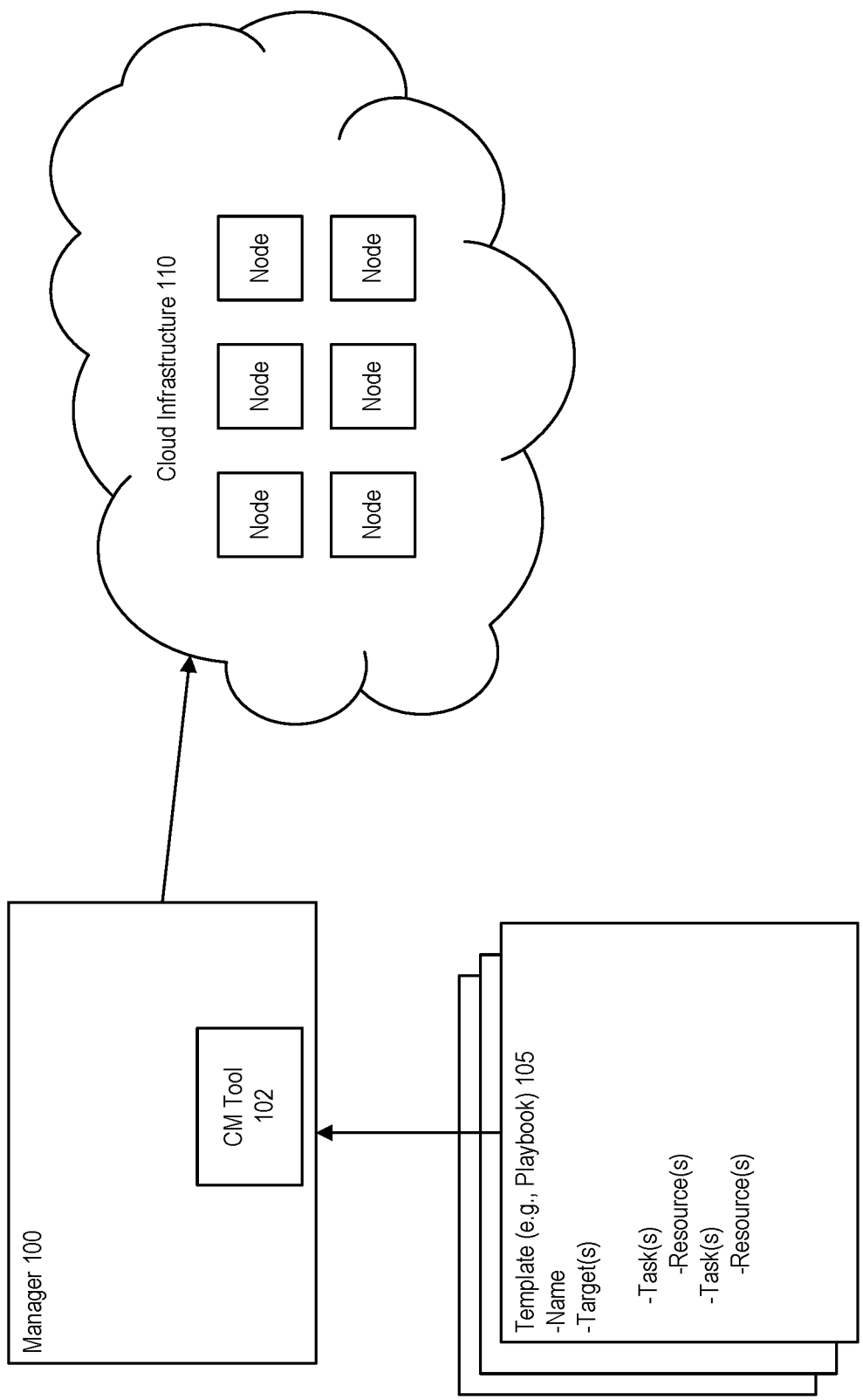
FIG. 1 shows a system in which a CM tool can be used to implement certain tasks, defined by a template, in a cloud environment, in accordance with an embodiment.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one. While specific implementations are discussed, it is understood that the specific implementations are provided for illustrative purposes only. A person skilled in the relevant art will recognize that other components and configurations may be used without departing from the scope and spirit of the invention.

Common reference numerals can be used to indicate like elements throughout the drawings and detailed description; therefore, reference numerals used in a figure may or may not be referenced in the detailed description specific to such figure if the element is described elsewhere.

Described herein are systems and methods for building idempotent configuration management modules in a cloud infrastructure service, in accordance with an embodiment.

DevOps teams and system administrators employ configuration management (CM) tools (such as Ansible, Puppet, Chef, cfengine) to declare the "desired state" of their infrastructure (and optionally "actions" to reach the desired state), and these are then used by these tools to provision the infrastructure, and configure, maintain or repair it if it diverges from that "desired state".

Some CM tools, such as cfengine, "converge" to the "desired state" through repeatable executions of a plan. Others, such as Ansible, directly ensure that the "desired state" is realized if there is a divergence detected.

These CM tools provide higher level abstractions and DSLs (domain specific languages) to users so that they can express their configuration automation steps easily.

FIG. 1 shows a system in which a CM tool can be used to implement certain tasks, defined by a template, in a cloud environment, in accordance with an embodiment.

In accordance with an embodiment, a manager 100 can be responsible for executing certain tasks at a number of nodes within a cloud environment 110. The manager can be accessed and utilized by one having sufficient credentials (e.g., such as a DevOps team) and can employ a CM tool 102, which can reference a template 105 to declare a desired state of the cloud infrastructure, as well as the nodes within the cloud infrastructure.

In accordance with an embodiment, the CM tool may comprise an Ansible CM tool, and the template can comprise an Ansible playbook. While several embodiments of the instant application reference Ansible as a CM tool, one of skill in the art would readily understand that the use of Ansible and the playbooks are merely one embodiment of the present disclosure. Other and different CM tools can be used interchangeably within the present disclosure.

In accordance with an embodiment, the template can comprise a name, a number of targets, as well as certain tasks and resources associated with the template. Depending upon the tasks to be performed, the manager can utilize one and/or a plurality of templates.

Idempotency

In accordance with an embodiment, idempotency, is basically "invariability under repetition". Repeating the same task multiple times always yield the same result (the result that was achieved by the first successful execution). Idempotency also means that if a desired state for a task is already achieved, no further action is required In accordance with an embodiment, idempotency can be one of the beneficial mechanisms to achieve repeatable and reliable automations of configuration management tasks. Idempotency of individual CM tasks is also a key requirement for "convergent maintenance", and therefore used for building autonomous, reliable systems.

In accordance with an embodiment, for cloud deployments, idempotency of infrastructure provisioning tasks becomes critical because if they are not idempotent, repeated executions of a user's CM plan would result in creation of needless additional cloud resources.

In accordance with an embodiment, configuration management runs that use these non-idempotent tasks, would results in unnecessary long configuration management cycles, and result in prohibitively expensive, sub-optimal computing environments for that deployment.

In accordance with an embodiment, idempotency of an individual configuration management (CM) task in a CM plan is one of the mechanisms used to achieve repeatable and reliable automations of infrastructure provisioning and configuration management tasks. This helps DevOps and operations personnel reliably apply and maintain configuration of their systems.

In accordance with an embodiment, however developing a configuration management module for a cloud infrastructure resource (the terms "resource" and "service" can be used interchangeably within this description where appropriate) so that it ensures idempotency for all actions against that resource, without requiring the user to follow a restricted set of rules is difficult.

In accordance with an embodiment, a cloud provider's resource CM modules either limit the set of attributes a user can configure, or require the user to provide other configuration attributes to get idempotent behavior for their actions. This is unfriendly to the user (as it requires them to think consciously of idempotency while writing their tasks), not optimal (as if the user deviates from the requirements imposed by the module, they lose out on idempotency), and certain cases time consuming to enforce (when multiple users work against the same environment, they are now forced to use the same task definitions to get idempotency).

In accordance with an embodiment, IaC tasks around cloud infrastructure provisioning also have its unique set of challenges.

Ansible

In accordance with an embodiment, Ansible is a very popular CM tool that is used widely by DevOps practitioners and system administrators to achieve IaC.

In accordance with an embodiment, in Ansible, playbooks are the high-level DSL that are used by users to describe configuration, initiate application deployment and perform orchestration of infrastructure components. Ansible provides a large set of "modules" out of the box to perform common provisioning, configuration management and deployment tasks. Modules are also the pluggability mechanism in Ansible, and allow third-party vendors (such as cloud service providers) to define new "rules" that Ansible users could use in their playbooks to control and manage their software or infrastructure.

Idempotency in Ansible Modules

In accordance with an embodiment, Ansible recommends that all the modules be idempotent, so that repeated playbook executions by users result in reaching the desired state quickly and reliably. The typical method by which an Ansible module achieves idempotency is by checking if the desired state is already reached, and if it is already reached, the module doesn't perform any change on the component the module manages.

In accordance with an embodiment, for instance, if a Task requires the creation of a cloud Service artifact, a cloud module can check if a resource already exists matching the user-specified desired state, and return eagerly if there exists such a resource. This ensures that repeated execution of the Task asserts the desired state, and doesn't perform any change on the Resource if it is already in the desired state.

Figure 2:
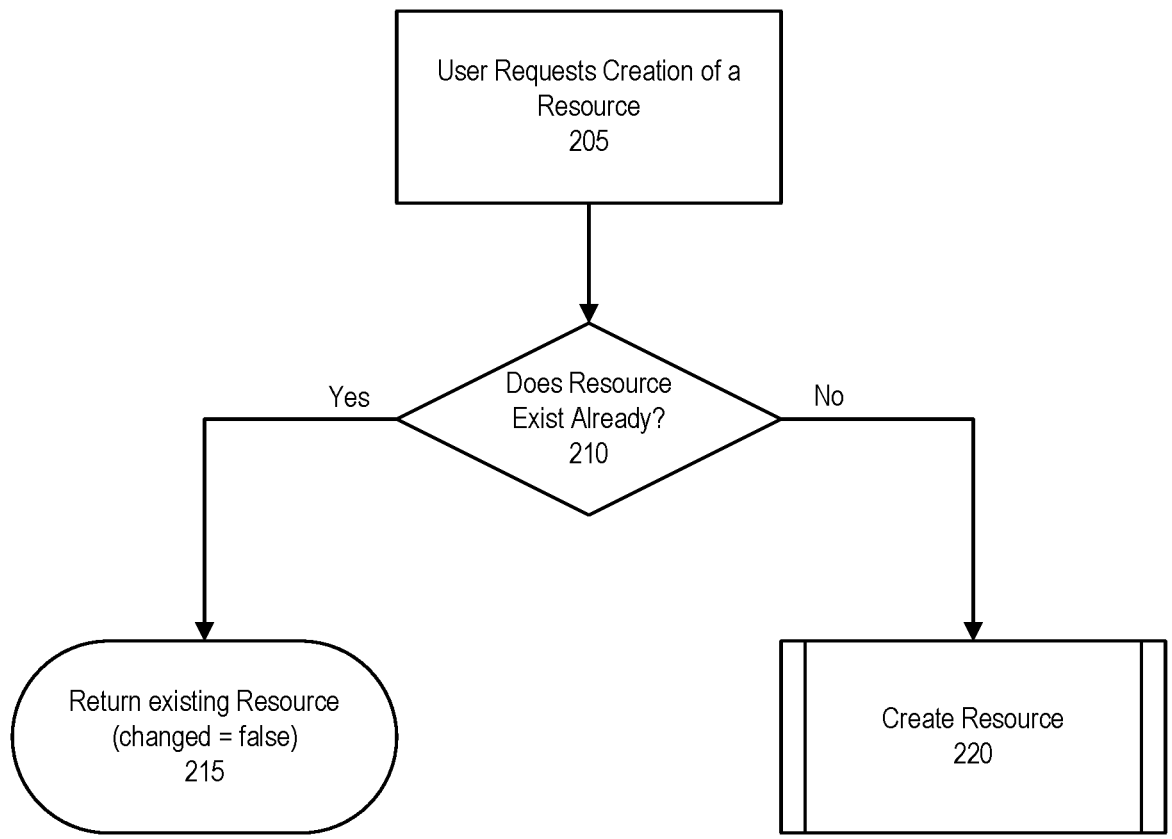
FIG. 2 is a flow chart showing a manner in which idempotence is guaranteed within an Ansible module, in accordance with an embodiment.

FIG. 2 is a flow chart showing a manner in which idempotence is guaranteed within an Ansible module, in accordance with an embodiment.

In accordance with an embodiment, at step 205, a user can request the creation of a resource. This can be done, for example, via a playbook that comprises one or more tasks that in turn use CM modules.

In accordance with an embodiment, at step 210, the method can check to determine if the requested resource already exists within the system, such as within a customer tenancy in a Cloud Provider.

In accordance with an embodiment, at step 215, if the requested resource already exists, then the resource is returned in answer to the user request. This can ensure idempotence as it guarantees a same result for each user request, no matter how many times step 205 is repeated.

In accordance with an embodiment, however, there are some drawbacks and complications to the simple method employed by Ansible in ensuring idempotence. Cloud providers that build Ansible Cloud Modules for provisioning of their Cloud infrastructure resources (such as Compute, Storage, and Network artifacts) face different challenges with respect to ensuring idempotency.

In accordance with an embodiment, these challenges include:
1) Cloud resources have complex configuration (both required and optional attributes) requirements. a) Optional attributes may have static defaults for their values, or may have dynamic "default" values generated at the time of resource provisioning. While matching against existing resources and user inputs, these configuration semantics must be honored by the module.
2) Different users at different times may provide a declaration of their desired state using any combination of these configuration attributes. In other words, two different playbooks written at different times, may have different configuration attributes in their tasks, for the same "desired state" of a Resource. The idempotency logic in the module must handle this variation and still compute the "desired state" and match against existing resources.
3) Cloud resources have a diverse set of Actions allowed on them (create, update, delete, lifecycle actions), and it is critical that idempotency is supported on all the actions.
4) The customer must not be required to write their tasks in a particular manner to receive idempotency. The complexity of verifying that the desired state matches what a user requests, must be handled by the modules themselves, and the user must not worry about writing their tasks in a particular manner to get idempotency.
5) A cloud vendor may evolve the Cloud Service and support newer configuration attributes, over time. An older module's idempotency logic must continue to working with future versions of the Cloud vendor's resource.
6) To handle custom requirements, it must be possible for the customer to control the matching logic to match their needs.

In accordance with an embodiment, various modules have been presented that attempt to overcome these challenges. These modules suffer from various limitations. For example, some of the modules require the specification of a specific subset of resource attributes by the user in the playbook, for resource creation idempotency to work. This means that users of those modules need to read the documentation of the module carefully to understand how they can achieve idempotency, and carefully craft a playbook to obtain idempotency. As well, some of the modules require attributes unrelated to the requested resource to enforce resource creation idempotency. Modules also suffer in that no module is provided that provides for the introspection of the Resource's API client to discover new configuration attributes. This means that the cloud modules need to be modified whenever there are changes to the Resource's API. In general, each module demands that, in order to support idempotency, the current task must exactly match the task definition that created the original resource. This is both cumbersome to the user, and difficult to enforce when there are multiple DevOps professionals working with a shared environment.

Idempotent Configuration Management Modules

In accordance with an embodiment, a method employs the following techniques during matching in order to address each of the challenges listed above.

Figure 3:
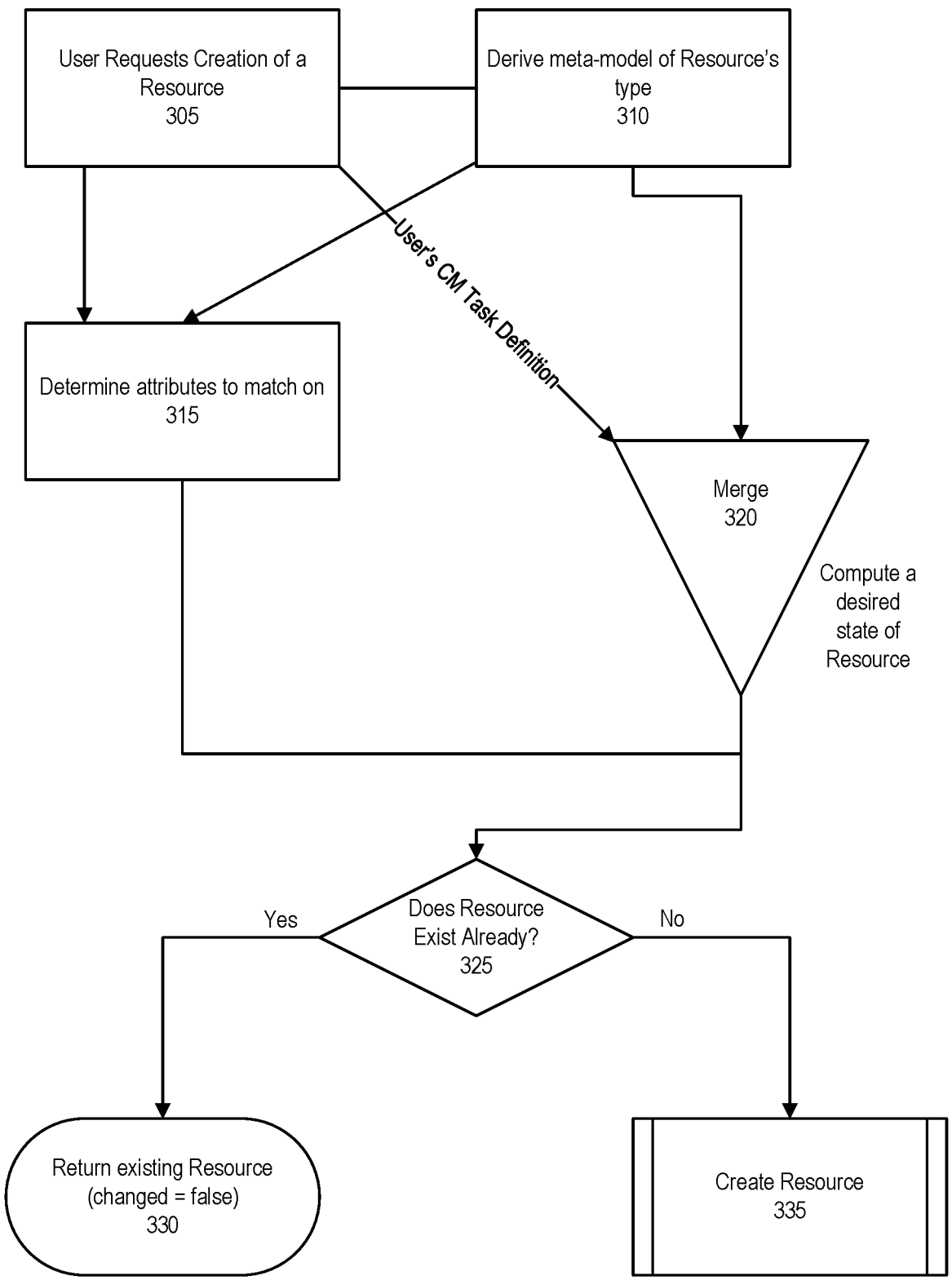
FIG. 3 is a flowchart of a method for building idempotent configuration management modules, in accordance with an embodiment.

FIG. 3 is a flowchart of a method for building idempotent configuration management modules, in accordance with an embodiment.

In accordance with an embodiment, at step 305, a user can request the creation of a resource. This can be done, for example, via a playbook that comprises one or more tasks that in turn use CM modules.

In accordance with an embodiment, at step 310, the method can introspect a current version of the Resource's API using the Resource's API client to derive a metamodel of the requested resource-type. This meta-model is used to determine the current set of configurable attributes of the resource. This helps address the challenges related to cloud resources having complex configurations, as well as the optional attributes that may have dynamic or static values. In addition, this method addresses the problems caused by updated and new configurations of cloud services.

In accordance with an embodiment, the method can also, at step 320, by considering the user's CM task definition, compute a "desired state" of the resource by merging the user's specifications in the task, and the discovered configuration requirements of the resource's type. This merge step takes special care to handle "optional" attributes, optional attributes with static and dynamic default values. This helps address challenges imposed by different users at different times providing declarations using a combination of configuration attributes, as well as the challenge associated with customers not being required to write tasks in a particular manner to receive idempotency. Using the meta-model of the resource type, the merge step can fill in defaults and optional fields to compute the "effective" desired state of the requested resource.

In accordance with an embodiment, at step 325, the method then lists all available resources, and compares against this computed "effective" "desired state" to determine if the resource already exists. If the resource is found, then it is returned to the user at step 330. When a matching resource is not found, the action on the resource (for example, CREATE, UPDATE) is performed, at step 335. This allows for idempotency to be supported no matter what action (or set of actions) (e.g., create, update, delete, lifecycle actions) are allowed to be performed.

In accordance with an embodiment, the matching performed at step 325 considers a desired state for the requested resource, the set of attributes against which matching must be done, and the list of already available resources.

In accordance with an embodiment, while the method is generic and works across various resource types, a customer may want to override the matching logic to require the matching to be performed only against a custom subset of attributes. Then instead of matching against all attributes of available resources, the method instead only matches against those attributes determined, at step 315, to be requested by the user. The method support this usecase too. This helps address challenge imposed by custom requirements and allows for the customer to control the matching logic to match their needs. As well, this can be used in situations where a request specifies a subset of attributes, then this subset is used to match. If no such set is specified, then the set of attributes to be matched on is picked from the meta-model of the resource type.

In accordance with an embodiment, the method provides a more user-friendly interface to the customer of the module by placing no restrictions to achieve idempotency. It is also more effective, reliable and optimal compared to competing approaches.

In accordance with an embodiment, the method employs a number of solutions, including: the use of the Resource's API to derive a meta-model of the cloud Resource type (the advantage also being that the derived meta-model being up-to-date with any updates on the Cloud Service's Resource API); determining the configuration related attributes (required, optional, static and dynamic defaults) of the Cloud Resource from this meta-model; merging user's inputs in the CM task, with the discovered meta-model to compute a "desired-state" for the user; and then, matching this computed "desired-state" against existing resources in the Cloud Provider to decide if the action needs to be performed or not.

In accordance with an embodiment, the method can be employed to guarantee idempotency for configuration management modules of cloud provider resources. This method ensures that all use-case scenarios with respect to idempotency are correctly handled. By ensuring idempotency, the user can be assured that the "desired state" of their topology is reached correctly. The solution also makes it easier for the user, to express the desired state of the Resource in a succinct and friendlier (as the user doesn't need to include anything special in their inputs to get idempotency) manner.

In accordance with an embodiment, the below pseudo-code shows a list of steps used to implement the method, and points out where certain portions address the difficulties in idempotency described above. While the steps show of the method are shown in the context of an Ansible module, one of skill in the art would readily understand that the method is generic and is applicable to other configuration management tools (e.g., Puppet, Chef, SaltStack, etc.).

```
- An module for a resource R calls check_and_create and provides
    - `R` a resource metadata model that contains information on how to create a resource, get
      all existing resources of R, attributes of R (optionally includes a fixed default value or a system
      generated default for the attribute),
    - `inputs` that represents the user's inputs representing the desired state of the resource.
    - `exclude_list` that represents the set of attributes that must be excluded (only if the user
      hasn't provided a value for that attribute) from the matching logic.
    - `default_attr_values` a dict that has the default values for all the default-able attributes
- check_and_create (R, inputs, exclude_list, default_attr_values):
    if user has requested "force_create":
        create_new_resource and return(changed=True, <new-resource>)
    existing_resources = get_all_existing_resources( ) using R's mechanism to list all resources
      of type R
    for existing_resource in existing_resources:
        if is_active(existing_resource):
            if does_existing_resource_match_user_inputs(inputs, existing_resource):
                return return(changed=False, <existing-resource>)
        if no existing resources matches user inputs:
            create_new_resource and return(changed=True, <new-resource>)
- is_active(resource):
    return true if resource's lifecycle_state is one of the ACTIVE lifecycle states for R's type
        else false
- does_existing_resource_match_user_inputs(inputs, existing_resource):
    attrs_to_consider = get_attributes_to_consider_for_matching(R)
    for A in attrs_to_consider:
        # if attribute is a composite (for example a list, a dict etc), recursively
        # perform the following check for every constituent of that composite
        # Addresses challenge #2, #4 as described in the above list at paragraph [00042]
        get existing_resource's value for A
        if user actually specified a value for A:
            get user's specification for A from inputs
            if existing_resource's value for A doesn't match user's desire for A, return false
            #existing resource is not a match for user's inputs, handles challenge #8 as
            described in above list at [00042]
        else if user hasn't specified a value for A:
            if A is in exclude_list: # handles challenge #6 as described in above list at [00042]
                continue checking other attributes
            else:
                if existing_resource's value for A matches the default of A, continue
                checking other attributes # ignore this and continue with other checks in that
                resource
                else return false # existing resource not a match for user's inputs
    # After checking all attributes in attrs_to_consider for equivalent
    return true # existing resource is a match for user's inputs
- get_attributes_to_consider_for_matching(R):
    if a user has requested only certain attributes to consider for matching, use that list.
    # Addresses challenge #6 as described in above list at [00042]
    return all attributes from R's GET model # Addresses challenge #1 and #4 as described in
    above list at [00042]
```

Figure 4:
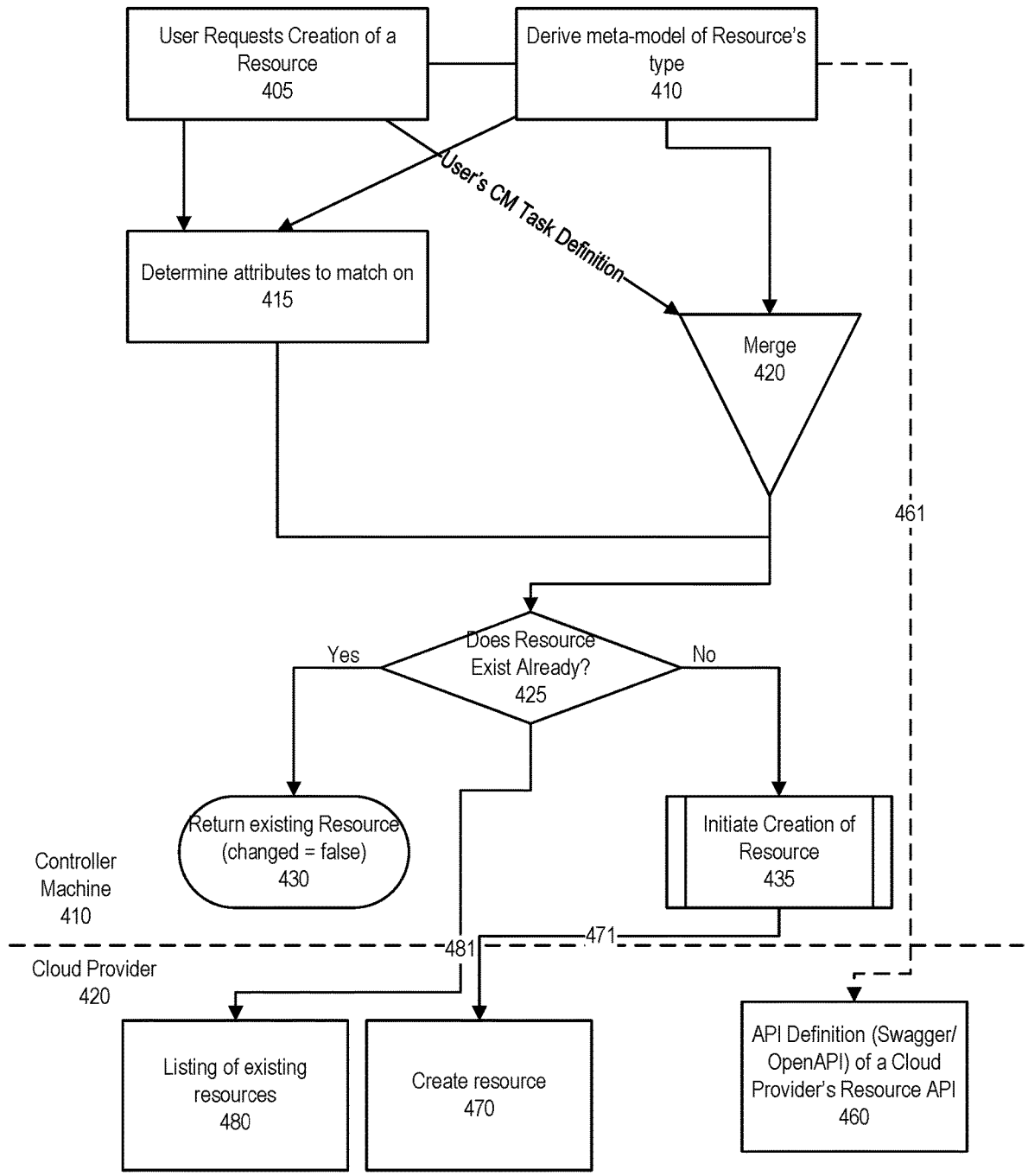
FIG. 4 shows a system for building idempotent configuration management modules, in accordance with an embodiment.

FIG. 4 shows a system for building idempotent configuration management modules, in accordance with an embodiment.

In accordance with an embodiment, at step 405, a user can request, at a controller machine 410, the creation of a resource. This can be done, for example, via a playbook that comprises one or more tasks that in turn use CM modules.

In accordance with an embodiment, at step 410, the method can introspect a current version of the Resource's API using the Resource's API client to derive a metamodel of the requested resource-type. This can be performed, for example, at step 461 wherein the controller machine utilizes a cloud provider's software development kit (or other alternative, e.g., a swagger specification) of an API to determine a meta-model of supported resources via the API definition 460 of the cloud provider's 420 resource API. This meta-model is used to determine the current set of configurable attributes of the resource. This helps address the challenges related to cloud resources having complex configurations, as well as the optional attributes that may have dynamic or static values. In addition, this method addresses the problems caused by updated and new configurations of cloud services.

In accordance with an embodiment, at step 420, by considering the user's CM task definition, compute a "desired state" of the resource by merging the user's specifications in the task, and the discovered configuration requirements of the resource's type. This merge step takes special care to handle "optional" attributes, optional attributes with static and dynamic default values. This helps address challenges imposed by different users at different times providing declarations using a combination of configuration attributes, as well as the challenge associated with customers not being required to write tasks in a particular manner to receive idempotency. Using the meta-model of the resource type, the merge step can fill in defaults and optional fields to compute the "effective" desired state of the requested resource.

In accordance with an embodiment, at step 425, the method then retrieves 481, from the could provider 420, a listing of existing resources 480, and compares against this computed "desired state" to determine if the resource already exists. If the resource is found, then it is returned to the user at step 430. When a matching resource is not found, the action on the resource (for example, CREATE, UPDATE) is performed, at step 435. Then, at 471, the resource 470 can be created, which allows for idempotency to be supported no matter what action (or set of actions) (e.g., create, update, delete, lifecycle actions) are allowed to be performed.

In accordance with an embodiment, the matching performed at step 425 considers a desired state for the requested resource, the set of attributes against which matching must be done, and the list of already available resources.

In accordance with an embodiment, while the method is generic and works across various resource types, a customer may want to override the matching logic to require the matching to be performed only against a custom subset of attributes. Then, instead of matching against all attributes of available resources, the method instead only matches against those attributes determined, at 415, to be requested by the user. The method support this usecase too. This helps address challenge imposed by custom requirements and allows for the customer to control the matching logic to match their needs. As well, this can be used in situations where a request specifies a subset of attributes, then this subset is used to match. If no such set is specified, then the set of attributes to be matched on is picked from the meta-model of the resource type.

Figure 5:
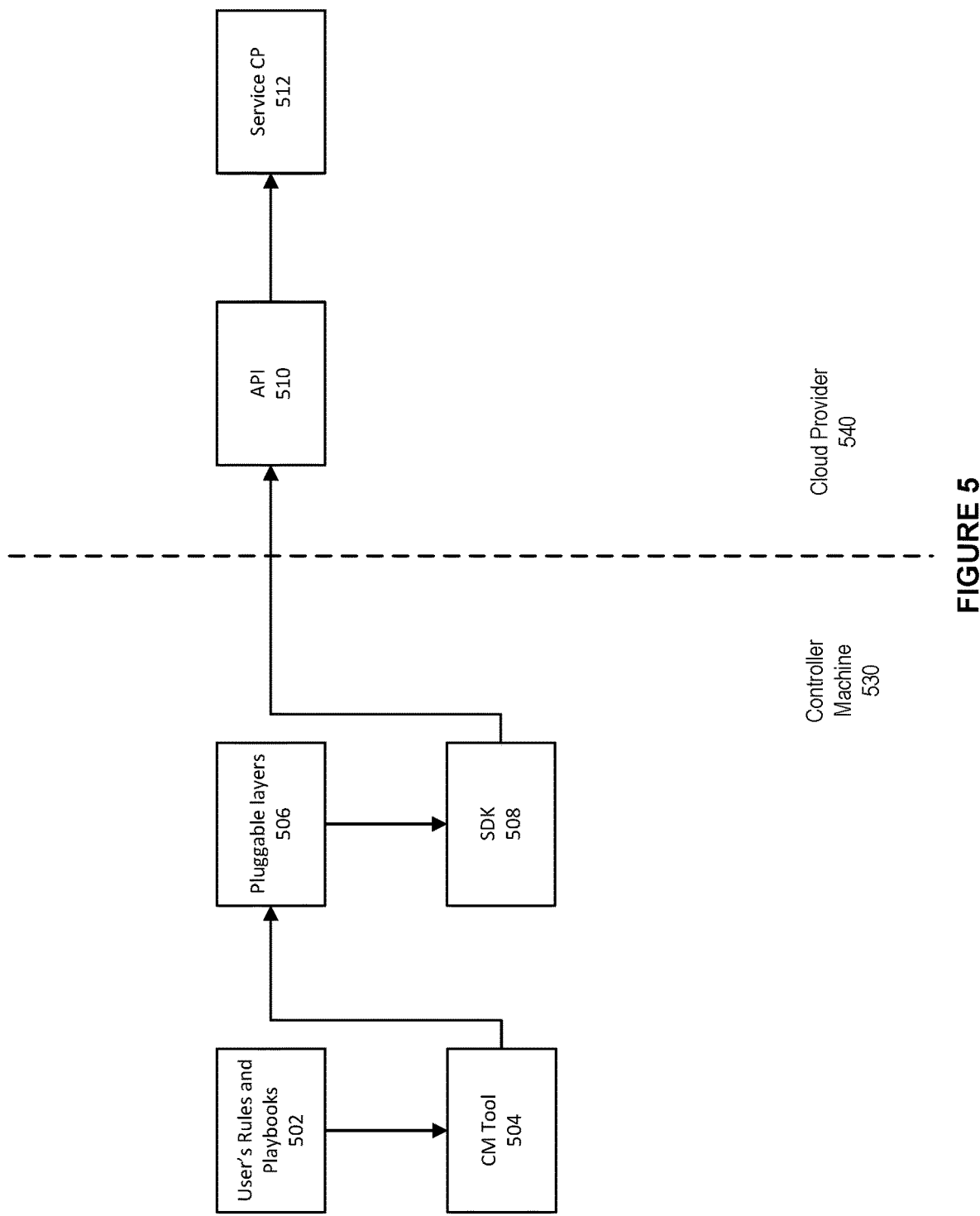
FIG. 5 shows a system for building idempotent configuration management modules, in accordance with an embodiment.

FIG. 5 shows a system for building idempotent configuration management modules, in accordance with an embodiment.

In accordance with an embodiment, a controller machine 530 can be accessed and utilized by a user. The controller machine can provide a configuration management tool 504 that can access and/or be accessed by a user's rules or playbooks. In accordance with certain embodiments, the CM tool 504 can comprise Ansible. However, one of skill in the art would understand that Ansible is merely one example of a CM tool that can be utilized within the disclosed systems and methods.

In accordance with an embodiment, the CM tool can utilize one or more pluggable layers 506. Depending upon the CM tool used within the system, these pluggable layers can be CM tool specific, or they can be generic in nature. In embodiments that utilize Ansible as the CM tool, these pluggable layers can comprise Ansible Modules. In other embodiments, the pluggable layers can comprise Terraform Providers.

In accordance with an embodiment, through the use of a software development kit 508, the CM artifacts can work with a cloud provider 540 application programming interface (API) 510 to create or manage cloud artifacts (e.g., resources) within the cloud provider 540.

Figure 6:
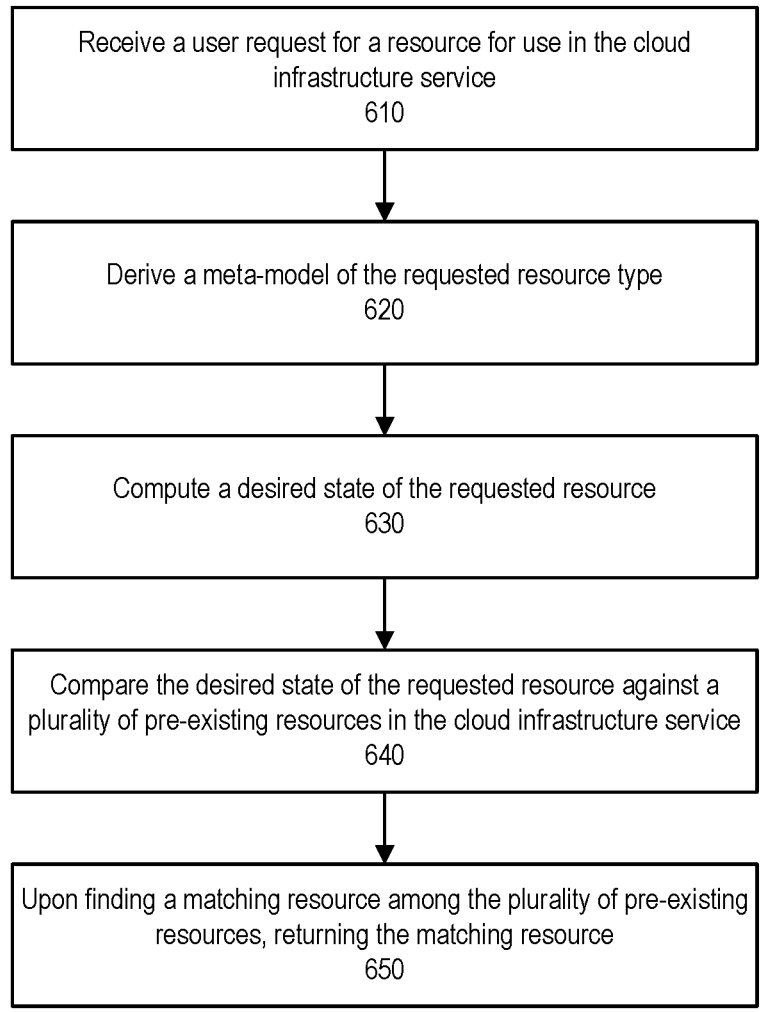
FIG. 6 is a flowchart of a method for building idempotent configuration management modules for cloud infrastructure services, in accordance with an embodiment.

FIG. 6 is a flowchart of a method for building idempotent configuration management modules for cloud infrastructure services, in accordance with an embodiment.

At step 610, the method can receive a user request for a resource for use in the cloud infrastructure service.

At step 620, the method can derive a meta-model of a requested resource type.

At step 630, the method can compute a desired state of the requested resource.

At step 640, the method can compare the desired state of the requested resource against a plurality of pre-existing resources in the cloud infrastructure service.

At step 650, upon finding a matching resource among the plurality of pre-existing resources, the method can return the matching resource.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. See, e.g. "The NIST Definition of Cloud Computing", Special Publication 800-145 (2011) which is incorporated herein by reference. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A method for building idempotent configuration management modules for cloud infrastructure services, the method comprising:
   receiving, at a controller machine, a user request for a resource for use in the cloud infrastructure service, the user request comprising a configuration management task definition, the configuration management task definition comprising a user specification;
   deriving a meta-model of a requested resource type of the requested resource to determine a set of configurable attributes of the requested resource type, wherein deriving the meta-model of the requested resource type comprises inspecting a current version of an application programming interface (API) of the requested resource, wherein the determined set of configurable attributes comprises:
   required attributes,
   optional attributes with static default values, and
   optional attributes with dynamic default values;
   computing a desired state of the requested resource, said computing of the desired state of the requested resource comprising merging the determined set of configuration attributes, including the required attributes, the optional attributes with static default values, and the optional attributes with dynamic default values, of the requested resource type and the configuration management task definition, including the user specification;
   comparing the desired state of the requested resource against a plurality of pre-existing resources in the cloud infrastructure service; and
   upon finding a matching resource among the plurality of pre-existing resources, returning the matching resource.

2. The method of claim 1, further comprising:
   upon not finding a matching resource, creating a resource comprising the desired state of the resource.

3. The method of claim 1, wherein the plurality of pre-existing resources comprises a defined set of resources.

4. The method of claim 3, wherein the user request comprises the defined set of resources.

5. The method of claim 1, wherein computing a desired state of the requested resource considers a configuration management task definition of the user.

6. The method of claim 1, wherein comparing the desired state of the requested resource against the plurality of pre-existing resources in the cloud infrastructure utilizes an application programming interface of the cloud infrastructure service.

7. The method of claim 1, wherein the user request comprises a configuration management plan, the configuration management plan comprising the requested resource.

8. A system for building idempotent configuration management modules for cloud infrastructure services, the system comprising:
  a computer system having a memory and a processor; and
  a configuration manager operating on said computer system, wherein the configuration manager operates to
    receive, at a controller machine, a user request for a resource for use in the cloud infrastructure service, the user request comprising a configuration management task definition, the configuration management task definition comprising a user specification;
    derive a meta-model of a requested resource type of the requested resource to determine a set of configurable attributes of the requested resource type, wherein deriving the meta-model of the requested resource type comprises inspecting a current version of an application programming interface (API) of the requested resource, wherein the determined set of configurable attributes comprises:
      required attributes,
      optional attributes with static default values, and
      optional attributes with dynamic default values;
    compute a desired state of the requested resource, said computing of the desired state of the requested resource comprising merging the determined set of configuration attributes, including the required attributes, the optional attributes with static default values, and the optional attributes with dynamic default values, of the requested resource type and the configuration management task definition, including the user specification of the requested resource type and the configuration management task definition, including the user specification;
    compare the desired state of the requested resource against a plurality of pre-existing resources in the cloud infrastructure service; and
    upon finding a matching resource among the plurality of pre-existing resources, return the matching resource.

9. The system of claim 8, wherein the configuration manager operating on said computer system, further operates to
  upon not finding a matching resource, create a resource comprising the desired state of the resource.

10. The system of claim 8, wherein the plurality of pre-existing resources comprises a defined set of resources.

11. The system of claim 10, wherein the user request comprises the defined set of resources.

12. The system of claim 8, wherein computing a desired state of the requested resource considers a configuration management task definition of the user.

13. The system of claim 8, wherein comparing the desired state of the requested resource against the plurality of pre-existing resources in the cloud infrastructure utilizes an application programming interface of the cloud infrastructure service.

14. The system of claim 8, wherein the user request comprises a configuration management plan, the configuration management plan comprising the requested resource.

15. A non-transitory computer readable storage medium, including instructions thereon for building idempotent configuration management modules for cloud infrastructure services, which when read and executed by one or more computers cause the one or more computers to perform the steps comprising:
  receiving, at a controller machine, a user request for a resource for use in the cloud infrastructure service, the user request comprising a configuration management task definition, the configuration management task definition comprising a user specification;
  deriving a meta-model of a requested resource type of the requested resource to determine a set of configurable attributes of the requested resource type, wherein deriving the meta-model of the requested resource type comprises inspecting a current version of an application programming interface (API) of the requested resource, wherein the determined set of configurable attributes comprises:
    required attributes,
    optional attributes with static default values, and
    optional attributes with dynamic default values;
  computing a desired state of the requested resource, said computing of the desired state of the requested resource comprising merging the determined set of configuration attributes, including the required attributes, the optional attributes with static default values, and the optional attributes with dynamic default values, of the requested resource type and the configuration management task definition, including the user specification;
  comparing the desired state of the requested resource against a plurality of pre-existing resources in the cloud infrastructure service; and
  upon finding a matching resource among the plurality of pre-existing resources, returning the matching resource.

16. The non-transitory computer readable storage medium of claim 15, further comprising:
  upon not finding a matching resource, creating a resource comprising the desired state of the resource.

17. The non-transitory computer readable storage medium of claim 15, wherein the plurality of pre-existing resources comprises a defined set of resources.

18. The non-transitory computer readable storage medium of claim 17, wherein the user request comprises the defined set of resources.

19. The non-transitory computer readable storage medium of claim 15, wherein computing a desired state of the requested resource considers a configuration management task definition of the user.

20. The non-transitory computer readable storage medium of claim 15, wherein comparing the desired state of the requested resource against the plurality of pre-existing resources in the cloud infrastructure utilizes an application programming interface of the cloud infrastructure service.

* * * * *